United States Patent Office 3,062,903
Patented Nov. 6, 1962

3,062,903
PROCESS FOR CRACKING AROMATIC
COMPOUNDS
Raymond C. Odioso, Glenshaw, Pa., and Kenneth J. Frech, Kent, Ohio, assignors to Gulf Research & Development Company, Pittsburgh, Pa., a corporation of Delaware
No Drawing. Filed Dec. 17, 1958, Ser. No. 780,949
4 Claims. (Cl. 260—668)

This invention relates to a process for cracking aromatic compounds and particularly to a process for cracking bibenzyl to produce styrene and benzene.

The aromatic compounds which are cracked in accordance with the process of this invention, characterized by the fact that they consist of at least two distinct ring systems wherein the ring systems [whether single or polynuclear (condensed or uncondensed)] are connected to one another, preferably via a substituent group, can be represented in general by the following structural relationship:

XYX wherein X can be an aromatic radical of phenyl, pyridyl, indenyl, pyrryl, furanyl, pyrazyl, thiophenyl, benzafuranyl, thionaphthenyl, decalyl, etc.; and Y and be a divalent alkyl radical having, for example, from two to 32 carbon atoms derived from such groups as ethyl, isopropyl, normal butyl, isobutyl, normal pentyl, isopentyl, normal hexyl, isohexyl, dodecyl, cetyl, hexacosanyl, triacontanyl, etc.; —NR— or —RN—NR$_1$—, wherein R or R$_1$ can be hydrogen or an alkyl radical having from one to 16 carbon atoms, such as methyl, ethyl, isobutyl, hexyl, cetyl, etc., or

Similarly Y can be —CHA— or —CHA:CHA$_1$— where A or A$_1$ can be NO$_2$,

—CHO, phenyl, a substituted phenyl, etc. The substituent Y can connect any available positions on the aromatic rings defined by X above or substituted derivatives thereof. Such aromatic compounds employed can be obtained from any source but conveniently can be obtained by employment of the processes disclosed and claimed in any one of our copending applications, Serial Nos. 780,932, now Patent No. 3,009,970, and 780,943 filed concurrently herewith. Examples of specific aromatic compounds which can be employed as charge in the cracking process of this invention are bibenzyl, 1,2-ditolylethane, 1,2-dixylylethane, 1,2-dimesitylethane, 1,1,2,2-tetramethyl-1,2-diphenyl-ethane, 4,4'-diethyl bibenzyl, 1,2-dithiophenylethane, 1,2-dipyridylethane, 1,2-difuranylethane, 1,2-dinaphthylethane, 1,2-dipyrazylethane, etc.

The aromatic compound defined above is cracked by subjecting such compound to closely controlled conditions of temperature, pressure and contact time in the presence of a suitable cracking catalyst. The temperature must be high enough to obtain a suitable cracking rate but not so high that polymerization, degradation or decomposition compounds would have a tendency to form to any appreciable extent. Thus a temperature of about 800° to about 1200° F. is suitable, but a temperature of about 950° to about 1050° F. is preferred. In order to assist and facilitate the cracking reaction a pressure of about 0.1 mm. Hg absolute to about 45 pounds per square inch absolute, preferably about 0.1 mm. Hg absolute to about one atmosphere is satisfactory. Especially critical in carrying out the process of the invention is the contact time, because it is especially desirable to break the substituent group which binds the aromatic rings without adversely affecting the rings themselves or favoring the formation of polymerization, degradation or decomposition compounds. Therefore, a contact time of about 0.1 to about 10, preferably about 0.1 to about 5, seconds is satisfactory.

The cracking operation can be effected in any suitable reaction zone, such as a tubular element, filled with a suitable cracking catalyst which will promote the simple molecular decomposition described above. Catalysts which are effective include readily available commercial hydrocarbon cracking catalysts. Silica-alumina cracking catalysts containing a major proportion of silica and a minor proportion of alumina are especially suitable. Other cracking catalysts, such as as composites of silica and magnesia, silica and zirconia, or composites of those catalysts containing minor amounts of promoters such as beryllia, thoria, zirconia, titania, etc., can be used. The particle size of the catalyst is not critical but should be about 0.01 to about 0.50 inch in diameter. A space velocity of about one to about 25 can be employed.

If desired, diluents such as toluene, water vapor, methane, benzene, etc., at mole ratios from about 1:1 to 100:1 based on the charge can be employed in order to inhibit undesired polymerization reactions or otherwise aid in controlling the desired cracking reaction. Mononuclear compounds obtained in the reaction can be separated from other compounds present in the cracked mixture by any suitable means, for example, in the case of bibenzyl fractional distillation, since the boiling points of bibenzyl, styrene and benzene are, respectively, 284° C. at 760 mm. pressure, 145.2° C. at 760 mm. pressure and 80.1° C. at 760 mm. pressure.

Representative of compounds which can be obtained in accordance with the present process as a result of cracking the aromatic compounds defined above are styrene, benzene, vinyltoluene, vinylxylenes, vinylmesitylene, isopropenylbenzene, ethylvinylbenzene, vinylthiophene, vinylpyridine, vinylfuran, vinylnaphthalene, vinylpyrazine, hexenylbenzene, etc.

The invention can further be illustrated by reference to the following examples. Although bibenzyl is employed as charge stock in the examples, it is apparent that other aromatic compounds can similarly be employed in lieu thereof with comparable results.

*Example I*

0.075 mole of bibenzyl and 1.575 moles of toluene, as diluent, were charged to a reactor, maintained at a temperature of 1022° F. and atmospheric pressure and filled with 6.9 grams of Filtrol TCC catalyst (a silica-alumina cracking catalyst, prepared by the acid activation of a subbentonite, and having by analysis, the following composition by weight: 73 percent SiO$_2$, 17 percent Al$_2$O$_3$, 1.5 percent Fe$_2$O$_3$, 4.0 percent MgO, 2.0 percent CaO, 0.03 percent K$_2$O and 0.01 percent Na$_2$O) in ⅛ inch pelleted form. The charge was passed through the reactor over a period of one second using a space velocity of 18.3. The product obtained was analyzed by mass and infrared spectrometric procedures and was found to contain 0.061 mole of bibenzyl, 0.010 mole of benzene (from bibenzyl), 0.003 mole of benzene (from toluene), 0.005 mole of styrene, 1.572 mole of toluene and 0.003 mole of xylenes. The yields from bibenzyl, on a mole percent basis, were 13.3 of benzene and 6.7 of styrene. The efficiency of conversion from bibenzyl was 71.5 percent benzene and 35.7 percent styrene.

*Example II*

The run of Example I was repeated. This time 0.303 mole of bibenzyl and 2.164 mole of toluene were employed, and the cracking was effected at a temperature of 977° F., atmospheric pressure, a contact time of 8.8 seconds and a space velocity of 2.0. The product obtained was found to contain 0.172 mole of bibenzyl, 0.046 mole of benzene (from bibenzyl), 0.034 mole of benzene (from toluene), 0.012 mole of styrene, 2.134 mole of toluene and 0.030 mole of xylenes. The yields of bibenzyl, on a mole percent basis, were 15.2 of benzene and 3.7 of styrene. The efficiency of conversion from bibenzyl was 35.1 percent benzene and 9.2 percent styrene.

While benzene and styrene both were obtained in appreciable quantities in the above examples, it is apparent that the efficiency of conversion from bibenzyl was far greater in Example I wherein the lesser contact time, one second, was employed. Polymerization of styrene was believed to have been inhibited at the shorter contact time.

Obviously, many modifications and variations of the invention, as hereinabove set forth, can be made without departing from the spirit and scope thereof, and therefore only such limitations should be imposed as are indicated in the appended claims.

We claim:

1. A process for cracking bibenzyl which comprises heating said compound solely in the presence of a cracking catalyst at a temperature of about 800° to about 1200° F. and a pressure of about 0.1 mm. Hg absolute to about 45 pounds per square inch absolute over a period of about 0.1 to about 10 seconds.

2. A process for cracking a symmetrical aromatic compound containing at least two aromatic radicals joined by at least two carbon atoms, with each of said aromatic radicals being individually attached to only one of said carbon atoms, which comprises heating said compound solely in the presence of a cracking catalyst at a temperature of about 800° to about 1200° F. and a pressure of about 0.1 mm. Hg absolute to about 45 pounds per square inch absolute over a period of about 0.1 to about 10 seconds.

3. A process for cracking bibenzyl which comprises heating said compound solely in the presence of a cracking catalyst and a hydrocarbon aromatic diluent at a temperature of about 800° to about 1200° F. and a pressure of about 0.1 mm. Hg absolute to about 45 pounds per square inch absolute over a period of about 0.1 to about 10 seconds.

4. A process for cracking bibenzyl which comprises heating said compound solely in the presence of a cracking catalyst and toluene at a temperature of about 800° to about 1200° F. and a pressure of about 0.1 mm. Hg absolute to about 45 pounds per square inch absolute over a period of about 0.1 to about 10 seconds.

References Cited in the file of this patent

UNITED STATES PATENTS

| 2,282,327 | Dreisbach | May 12, 1942 |
| 2,420,688 | Sturrock et al. | May 20, 1947 |
| 2,422,164 | Dixon | June 10, 1947 |
| 2,422,171 | Saunders | June 10, 1947 |

FOREIGN PATENTS

| 153,805 | Japan | Nov. 20, 1942 |

OTHER REFERENCES

Abstracted in Chemical Abstracts, volume 43 (1949), page 3454a.

Yura et al.: Chemical Abstracts, volume 45 (1951), page 1559h. Abstracted from Journal Soc. Chem. Ind. (Japan), vol. 44, suppl. binding-pages 476–8 (1941).

Horrex et al.: Discussions Faraday Soc., 1951, No. 10, pp. 187–197.